July 16, 1968     A. SCHURE ET AL     3,392,459
TEACHING DEVICE
Filed March 13, 1961     2 Sheets-Sheet 1
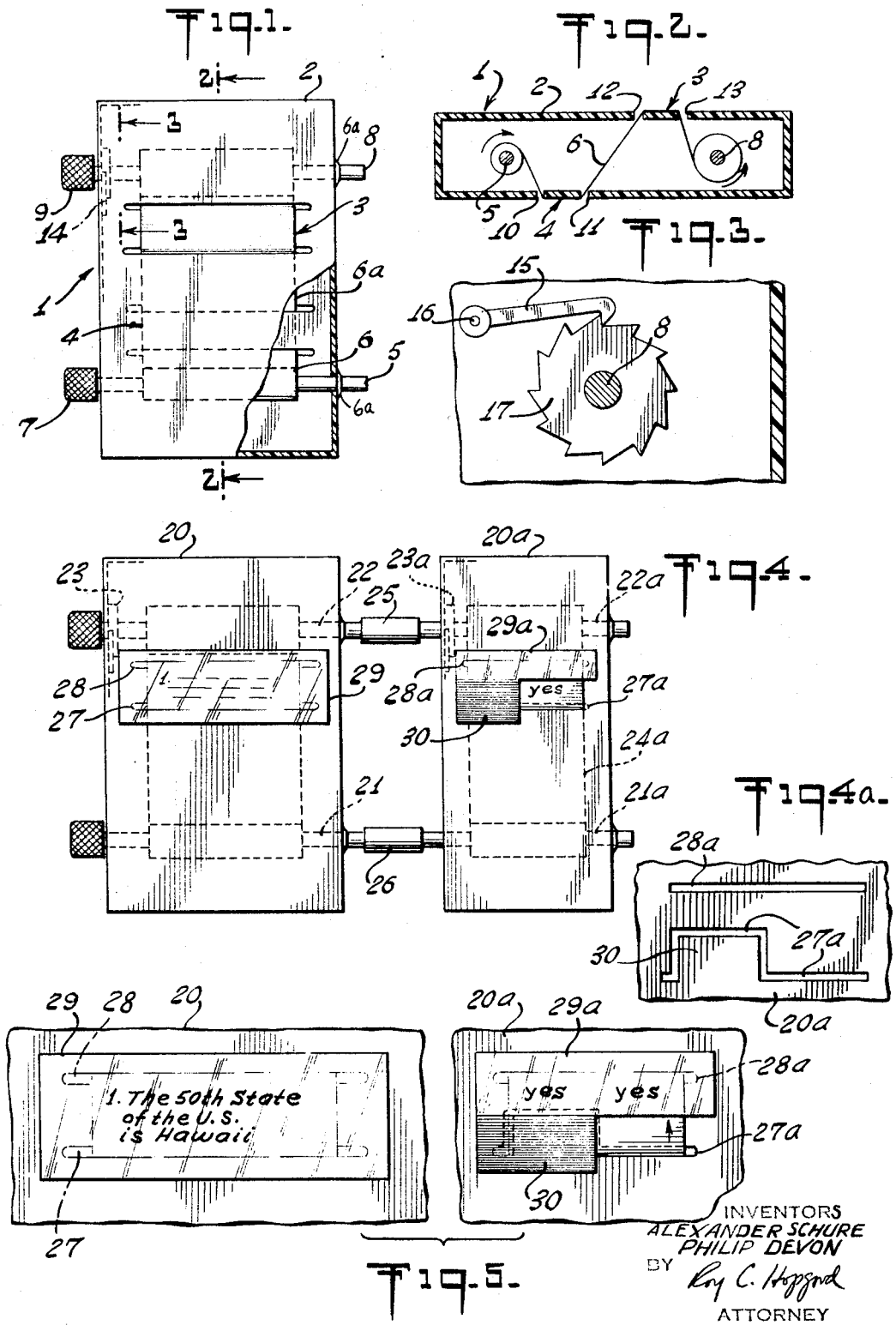
INVENTORS
ALEXANDER SCHURE
PHILIP DEVON
BY Roy C. Hopgood
ATTORNEY July 16, 1968 A. SCHURE ET AL 3,392,459
TEACHING DEVICE
Filed March 13, 1961 2 Sheets-Sheet 2
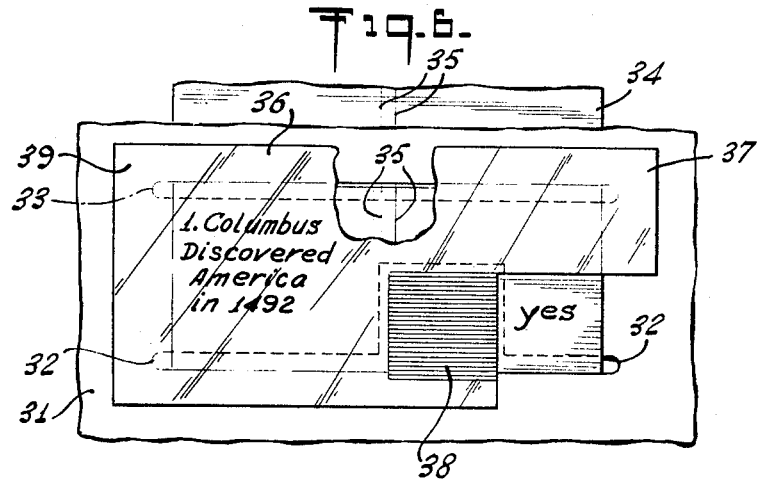
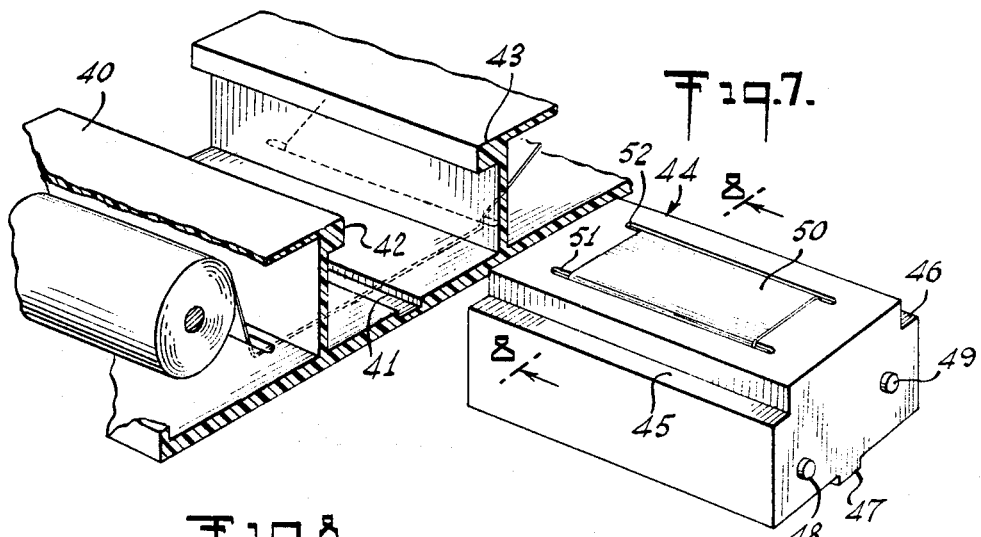
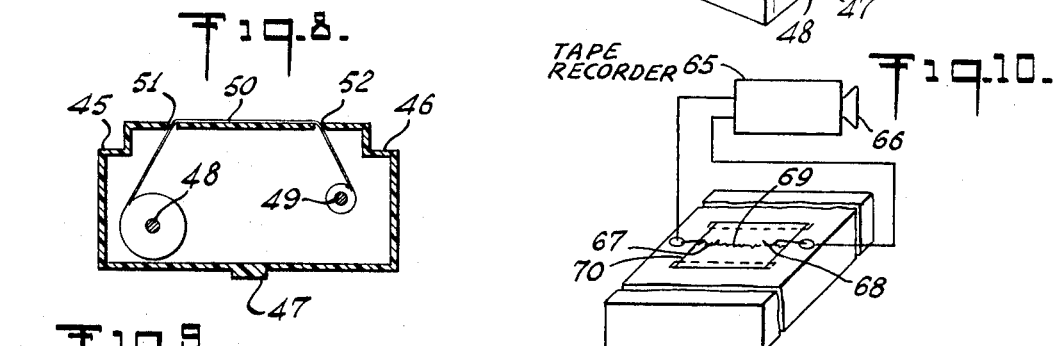
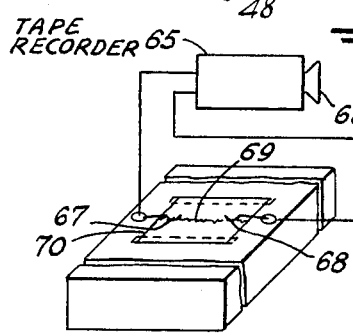
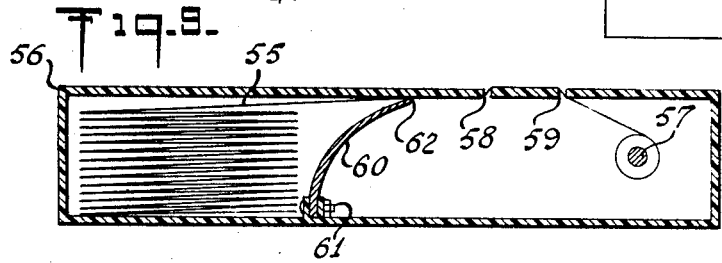
INVENTORS
ALEXANDER SCHURE
PHILIP DEVON
BY
ATTORNEY

United States Patent Office 3,392,459
Patented July 16, 1968

3,392,459
TEACHING DEVICE
Alexander Schure, Belle Harbor, and Philip Devon, Long Beach, N.Y., assignors, by mesne assignments to Educational Aids Publishing Corp., Carle Place, N.Y., a corporation of New York
Filed Mar. 13, 1961, Ser. No. 95,223
7 Claims. (Cl. 35—9)

This invention relates to a cartridge-type teaching device.

As has become known in recent years, there is a pressing need for a new technique in educational methods. The need is a result of the increasing population and the inadequacy of the present sources of teacher supply and school facilities. As a result of these and other pressures on the educational system and methods, considerable effort and money have been expended to improve the efficiency of the educational process.

Recently, teaching machines have been proposed which represent a new type of equipment in education. The teaching machines have made a dramatic impact upon the educational process and give promise of greatly increasing the efficiency of the educational process.

As is known, teaching machines are devices which increase the teacher's control over learning activities within a classroom. They are primarily designated as a tool for the teacher. In this sense, they are analogous to books, radio, closed circuit television, motion pictures and other teaching devices. They present information as one of their prime functions.

Although the invention will be described as an institutional teaching aid with compromise proof features, the invention may also be used as a self-educational aid for home use and the compromise proof features need not be employed. For example, the novel teaching device may be used as a supplement with encyclopedias now becoming so popular for home use.

In copending application of Alexander Schure, Ser. No. 69,599, filed Nov. 16, 1960 now Patent No. 3,046,675, there is disclosed an improved teaching device which may be manufactured relatively inexpensively as compared with other known teaching devices. The device of this invention, however, involves a novel concept of enclosing the teaching material within a modular form which may be used individually or in combination with other similar forms to increase the functional and educational capabilities of the device. By providing a basic unit or module, including a cartridge for containing the material bearing stimuli, the device is relatively inexpensive to manufacture, permits use of the device at home or in the classroom and effectively extends the application of the device to an unlimited range of areas and subjects. This almost unlimited versatility of the novel device is made possible through a simple substitution of cartridges within a module, each cartridge containing different subject matter.

Another object of the invention is to provide a compromise-proof cartridge-type teaching device or modular unit which can be easily loaded in a teaching machine.

A further object is to provide a programmed cartridge-type teaching device capable of being used over and over again for use in combination with another cartridge-type device containing a disposable response sheet.

A still further object is to provide a cartridge-type teaching device adapted to contain both program and answer sheets and which in itself is adapted for use in determining the student's response to the educational content of the device.

These and other objects will more clearly appear when taken in conjunction with the following description and the accompanying drawing, wherein:

FIG. 1 illustrates one embodiment of a modular form provided by our invention partially broken away to show more clearly the structure thereof;

FIG. 2 is a cross section taken along line 2—2 of FIG. 1;

FIG. 3 is an enlarged cross section taken along line 3—3 of FIG. 1 showing the details of a pawl and ratchet arrangement which may be used with the cartridge;

FIG. 4 depicts a tandem-type arrangement of a program module associated with an answer module;

FIG. 4A is an enlarged fragment of an answer module showing in more detail the slots which make up the observation station;

FIG. 5 is an enlarged fragment of FIG. 4 showing the relation between the program sheet and the answer sheet of the two cartridges;

FIG. 6 shows fragmentarily the window of a module in which the same sheet material is adapted to contain both the program stimuli and the response;

FIG. 7 is illustrative of one embodiment of a cartridge adapted to be inserted into a portion of a module;

FIG. 8 is a cross section taken along the line 8—8 of FIG. 7;

FIG. 9 is a cross section of another embodiment of a cartridge in which only one spool is employed; and FIG. 10 is a simplified diagrammatic illustration partially fragmented of an educational device operated by contact buttons on the response sheet.

In accordance with the broad aspects of our invention, we provide a cartridge-type teaching device comprising a housing, an observation station associated with a surface of said housing, means within said housing for supporting sheet material containing stimuli including means for progressively moving at least a portion of said sheet material to the observation station, means for exposing a predetermined portion of sheet material containing stimuli to be observed at said observation station, and means within said housing for receiving and storing at least said predetermined portion after said portion has passed the observation station.

The foregoing basic modular unit, i.e., cartridge and housing, permits the handling of all or part of the program and, as stated hereinbefore, is advantageous in relieving the teacher of loading or unloading responsibilities and in permitting ready storage of the program for immediate use according to subject matter. The units are enclosed and are adapted to feed one or more rolls or slips of paper from the bottom to the top, or the top to the bottom, or from top to bottom and back to the top again, depending on the arrangement of the observation station or window associated with the housing.

The cartridge or modular unit may contain as an integral part of its structure a spring, clip, ratchet or other device to constrain the direction of motion so as to allow feeding of sheet material in one direction only. However, one of the important advantages of the invention resides in the unique construction of the observation station which eliminates the necessity for separate constructional means to constrain the direction of motion. The modular unit may be arranged with two or more windows (observation stations) on opposed surfaces of the housing with the paper feed inbetween so that stimuli may be printed on both sides of the paper and observed without reversing the cartridge.

In a preferred embodiment, two or more separate cartridges may be used; one for the presentation of the educational program, and the second for the correct answers with additional space for the student to write in his responses. This embodiment has the advantage of permitting continuous reuse of the educational program. Of course, one cartridge housing both program and answer space may be utilized, although the distinct advantages of a disposable answer section are apparent. The student operates the machine by placing the cartridges into operable position and then manipulates the program cartridge to expose the stimuli constituting the first item. The answer cartridge, which has been similarly loaded and which lies alongside the program cartridge shows a blank space with a corresponding number where the student will write his response. After writing the answer, the student advances the answer cartridge, bringing into view the correct answer which had been hidden by any suitable masking or obscuring means and observes the correct answer which now lies in close proximity to his response. The answer cartridge is now positioned for the next answer.

Of course, the most economical embodiment does not include mechanical springs, grippers, or other devices which prevent paper slippage and also eliminates the ratchet necessary to keep the paper moving in one direction only. In the cartridge dealing with the program, which is the modular unit presenting the items to be answered, the slot is so structured as to cause the paper to be fed under tension between slots lying on the top and the bottom of the box. A plastic or other type of window at the observation station may be utilized to prevent the paper from being soiled. On the answer cartridge, the same type of slot is used with an appropriate mask to conceal the correct answer while the student is writing his answer, without any possibility of compromise on the part of the student. The sheet is preferably in the form of a reel containing the answers and the answer spaces, and is inserted in the second module in such manner as to eliminate external dowels or handles which could be turned to move the paper in reverse direction. That is, the student may turn the answer sheet in one direction only. When he has completed all of the questions, he has a neatly rolled, sealed cartridge which he may turn in to the instructor. The instructor may then issue another question cartridge for use in the same modular unit and another answer cartridge for the tandem unit. Alternatively, the question cartridge may be handed to another student with a new answer cartridge. In this manner the teacher may utilize the modular machine many times during the class day in many different ways to effectuate optimum teaching efficiency.

The modular form which encloses the program cartridge may be so structured as to house the answer cartridge within it simply by providing an opening, which may be left opened or sealed at the discretion of the designer, under each of the tension slots. The answer cartridge would be slipped into position directly underneath each of the tension slots. The observation window cut opposite the slots into the frame would permit a unit package of very convenient shape and relatively small size, and reduce the answer cartridge to dimensions easy to handle. The answer cartridge would contain its own dowel. The modular form of the machine could, of course, be constituted of wood, paper, cardboard, plastic or other suitable materials, depending upon the choice of the designer.

As illustrative of one embodiment of the invention, reference is made to FIG. 1 (partially broken away for purposes of clarity) which depicts a modular unit designated generally by the numeral 1 comprising a housing 2 formed of top, bottom and side walls as shown. The top surface of the housing has an observation station designated generally as 3 and a similar observation station 4 at the bottom surface thereof. A spool 5 containing a roll of paper 6 of program material is provided at one end of the housing axially supported at the sides thereof, the spool having a knurled head 7 as shown. A takeup spool 8 with knurled head 9 is provided at the other end of the housing for taking up the sheet material, the sheet material passing through slots in the housing (note FIG. 2) so as to expose stimuli on said sheet for observation at stations or windows 3 and 4. The spools 5 and 8 are axially stabilized by means of star washers 6a or the like. Thus, as sheet 6 is positively unraveled from spool 5 during takeup of spool 8, the sheet passes through slot 10 and over the outside bottom surface of the housing, then through slot 11 and diagonally through the interior of the housing through slot 12 over the top surface of the housing, down through slot 13 and around spool 8. The sheet moves in the direction of the arrow indicated at station 3 of FIG. 2 while the student observes or studies the educational content of the sheet. As is apparent, only a portion of the sheet is exposed, the remainder of the unravelled sheets being masked by the housing itself. The unique arrangement of providing observing stations on opposite sides of the housing permits both sides of the program sheet 6 to be used conveniently by simply reversing the position of the box.

Although we have found that the intertwining of the paper sheet through the housing adequately restrains the sheet against slippage, if desired a pawl and ratchet wheel combination 14 (note FIG. 1) is provided which is shown more clearly in the enlarged cross section of FIG. 3, as viewed along line 3—3 of FIG. 1. The pawl 15 is pivotally connected to side wall means of the housing via pin 16 with the end of the pawl riding the teeth of ratchet wheel 17 as shown, but being adapted to lock the wheel when it tries to move in the opposite direction; the wheel 17 of course being integral with or rigidly attached to the spool 8 by any suitable means. Alternatively, a spring may be employed which permits only unidirectional rotation of the spools.

In the basic unit shown in FIGS. 1 and 2, only one observation station need be provided, although, as previously explained two observation stations have the advantage of utilizing both sides of the program sheet. Thus, as the sheet nears its end of travel at station 3, warning stimuli would appear advising the observer to reverse the housing or turn over the cartridge for the next program of material.

We find one embodiment of our invention particularly valuable in presenting prompts, questions, stimuli and the like, while concealing the correct response or answer until predetermined conditions are fulfilled. Such an embodiment is shown in FIG. 4 where two basic modular units are employed, one containing the programmed material, the other the corresponding correct answers predeterminedly concealed until the question has been answered by the student by recording in the place provided on the answer sheet in the other unit.

Referring to FIG. 4 two cartridges are shown 20 and 20a, both similarly provided with unwinding spools 21, 21a and takeup spools 22, 22a. Two pawl and ratchet wheel combinations 23, 23a may also be provided if desired in association with the takeup spools. A question or program sheet 24 is associated with the spools of cartridge 20 and an answer sheet 24a with the spools of cartridge 20a. The two cartridges are preferably, although not necessarily, synchronously associated together with, e.g., flexible couplings 25 and 26, e.g., heavy rubber tubing, so that as program sheet 24 is fed from unwinding spool 21 to takeup spool 22, answer sheet 24a moves with it. Other forms of rigid or flexible coupling will be apparent to those skilled in the art. It will be appreciated that the cartridges need not be connected together but operated separately, provided one is positioned relative to the other so that predetermined portions on each sheet correspond indicia for indicia. If it is not desired to synchronize the movement of the spools, the dowels extending through one unit, e.g., the program unit may be used to support and guide the answer unit by simply passing through the side walls thereof.

As in FIG. 1, the modular unit 20 of FIG. 4 has a window or observation station determined by two parallel slots 27, 28 through which the program or question sheet is threaded as described for FIG. 1. In order to protect the sheet from being soiled or render it tamper-proof, a transparent covering 29 of plastic sheathing or other material is secured to the surface of the module, the upper and lower margins thereof being free to allow for traversing of the program sheet beneath the covering.

Similarly, cartridge 20a is provided with a window or observation station determined by slots 27a, 28a. The lower slot 27a is angularly configurated to provide opaque tongue or mask 30 which conceals a correct answer on the answer sheet while the observer is recording his answer in an adjacent space left for that purpose. The arrangement of slot 27a and tongue 30 is more easily discernable in FIG. 4A. A transparent covering 29a is similarly provided secured on top of the window of module 20a to insure an answer sheet that is compromise proof. A cutout is provided at the right hand corner of the transparent covering in order to provide accessibility to a predetermined portion of the answer sheet for recording the observer's answers.

Thus, assuming question No. 1, calling for a yes or no answer, has been exposed on a predetermined portion of the program sheet in module 20, the observer writes in an answer for example "yes," on the portion of the answer sheet provided for that purpose in synchrony with the program sheet. Underneath mask 30, the correct answer is concealed from the observer until the observer records his answer and then moves the answer sheet or, if preferred, the two sheets synchronously by turning takeup spool 22 to the position shown in FIG. 5 which is a fragmented enlargement of the observation stations shown in FIG. 4.

If desirable, the questions and answers may be associated with a single modular unit. In this connection, the program and answer portion may appear on one and the same sheet, or on two parallel arranged strips, provision being made for a masking means to conceal the correct answer on the answer sheet. One embodiment of a single module is shown fragmentally in FIG. 6 which depicts a fragment of modular unit 31 having slots 32, 33 through which sheet material 34 is threaded as in the other embodiments described hereinbefore. The sheet is divided by a pair of lines 35 into two main portions, program portion 36 and answer portion 37. The answer portion is further sub-divided into a correct answer portion concealed by mask 38 associated with slit 32 and a space adjacent the concealed answer for recording the answer of the observer. A transparent covering 39 of plastic or other material is secured to the top of the housing to protect the sheet material and to aid further in rendering the device compromise-proof. The cover has a cutout in the lower right hand corner adapted to render accessible only that portion of the answer sheet to the observer for the recordation of the answer.

While the foregoing combined program and answer modular unit maintains distraction to a minimum, we prefer a separate program unit as it can be used over and over again without recharging while in the combined type, the combined program and answer sheet must be replaced after use by a student.

One of the advantages of our invention is that a cartridge may be produced as a subunit for insertion into the modular unit. One such embodiment is shown in FIG. 7 which depicts a fragment of a modular unit 40 having a substantially U-shaped trough having a track or groove 41 at the bottom thereof and inwardly projecting shoulders 42 and 43 at the top portion of the U, said trough being adapted to receive in locking engagement therewith cartridge unit designated generally by numeral 44. The upper corners of the cartridge are provided with steps 45 and 46 for cooperating with shoulders 42 and 43 of the larger device. The bottom of the cartridge has a downwardly projecting tongue 47 adapted to ride groove 41 of the module when the cartridge is inserted into the trough. As in the previously described embodiments, cartridge 44 is provided with unwinding and takeup spools 48, 49, respectively, for moving sheet material 50 across the top of the units through slots 51 and 52 (note also FIG. 8). Alternatively, a cartridge having only a single takeup spool may be employed. The supply spool would not extend beyond the walls of the unit as, for example, in the convenient roll film camera. The paper feed in this form of cartridge is inherently unidirectional. The cartridge is preferably located between an observation station and the opposing wall as maximum space is provided at these regions.

While the various embodiments depicted in the drawing show the sheet material supported as a coil on an unwinding spool, the sheet material to be fed to the observation station may be stored in other forms. One method is shown in FIG. 9 which is a cross section of a cartridge showing accordion folded sheet or strip material 55 stored within cartridge 56. A takeup spool 57 is provided for winding up the strip as it passes through slots 58 and 59. If desired, a finger or wiper 60 of resilient tmaterial, e.g., spring steel, may be provided anchored by a bolt or screw 61 at the bottom of the cartridge, with the end 62 of the finger being adapted to maintain continual pressure against the strip and the underside of the top of the cartridge so as to provide the necessary tension on the strip as it passes through the slots.

As will be appreciated other types of masking means may be employed for concealing the correct answer during the operation of the cartridge of the invention.

It may be desirable to utilize the novel teaching device in combination with another form of educational tool, such as an audio or visual device, along the lines mentioned in copending application Ser. No. 69,599, now Patent No. 3,046,675. Thus, the teaching device provided by our invention may be provided with means for automatically controlling the operation of the additional educational tool. Various kinds of response means may be employed, such as conductive ink or printed circuitry carried on one of the strips in the cartridge. For example, the marking of a heavy lead pencil in the answer column might be sufficient in cooperation with other circuitry to electrically couple in an audio device, e.g., a tape recorder, a visual scoring light, etc. In FIG. 10 we show one combination in which we utilize as an educational tool a tape recorder 65 having a loudspeaker 66 contained within an insertable cartridge such as shown in FIG. 7. At predetermined intervals on the response sheet, e.g., after a series of questions covering one aspect of a subject or at the conclusion of a lesson, the response sheet is provided with button contacts 67, 68 and printed strip 69 or sheet 70 to complete the power circuit for the recorder, whereby the record is automatically set into operation. Alternatively, the response sheet may be perforated, and the perforations sensed by suitable sensing means to operate the recorder.

It is apparent that a wide and varied combination of elements is possible through the use of the cartridge provided by the invention.

Programs utilizing this type of device will normally use instructional items, which are adapted to permit the student to obtain the correct answer, leading him very carefully along the direction desired. However, if the student makes an incorrect response, it is desirable at the time it is made to expose a referral number which will direct him to alternate information or, actually present the referral information directly at this time. A student may also indicate whether his response was correct or incorrect, so that the teachers may make whatever observations are necessary with respect to the student program and the efficiency of the program structure.

Among the advantages of the modular units are: The programs and answer tapes are self-contained. The program portion cartridge may be reused indefinitely. The answer cartridge may be submitted to the teacher, without interfering with the utility of the question cartridge, for checking or verification if so desired, and is a disposable item. The programs may vary in length at the discretion of the educational experts who prepare them. They may contain, if desired, either the entire program and answers, or be separated, to be used in conjunction with a corresponding answer portion housed in its own cartridge. When the answer cartridge is disposable in the manner described above, the bulk program is reusable constantly, which is an excellent advantage for both the school system and the student who wishes to restudy the materials.

The cartridges may be made reversible by the simple expedient of turning them over. This permits a smaller paper consumption with resultant economies in production and use. In the case of a separate answer cartridge, it may be turned in, in its original sealed form, to the teacher for examination. The program portions of the cartridges remain continuously sealed and may be stored and submitted to the teacher or to the library, or used in the home in their sealed form. The problem of compromising the program when loading is removed. When used in conjunction with either a simple or more complex machine, this permits freeing the machine at any time desired by the simple expedient of slipping out the cartridges and storing them until the next time the student will use the machine. With many current devices a longer program ties up the machine for a long period of time.

Additional advantages are that the cartridges may contain paper, film, a combination of both, or other materials to be used for projection, exposure, advancement or such, for any basic device.

The modules and cartridges allow the teaching machine to be completely reliable, quiet, and extremely easy to operate. No special apparatus other than a simple housing is required when the cartridges are used. The program frames and the answer responses frames are always at the same level and exposed in the proper sequence, positioning themselves automatically. If used, the one-way ratchet may be part and parcel of the cartridge, or be part of an external housing. The spindles, dowels, or other materials forming the roller sections may protrude through the cartridges or may be slotted so that they may turn only by key or ratchet, entering the box from an internal housing.

The programs may be filed on shelves or in drawers, just as with books, the larger programs being separated into chapters, each chapter having its own cartridge. The materials are freed from the normal wear and tear of the text book which is continuously handled directly by the student.

Either one dowel or two may be used to operate the machine. Cartridges or modules may be equipped with color filters which permit dual channels of appropriately colored information to be carried.

While the present invention has been described in conjunction with preferred embodiment, it is to be understood that modifications and variations may be resorted to without departing from the spirit and scope of the invention as those skilled in the art will readily understand. Such modifications and variations are considered to be within the purview and scope of the invention and the appended claims.

We claim:

1. A teaching device comprising:
housing means having side and end surfaces and opposed top and bottom working surfaces;
an observation station on one of said opposed surfaces, said observation station defining a frame window having a bottom edge and a top edge running transversely of said housing;
means within said housing movably supporting sheet material running longitudinally of said housing,
said sheet material compring on one side thereof a first sheet portion containing a set of stimuli, second and third sheet portions located adjacent the side of said first sheet portion in a direction transverse that of the direction of travel of said sheet material containing a set of correct answers and a set of recording spaces for recording spaces for recording answers thereon responsive to said stimuli;
means for guiding said sheet material within said housing so that said side of said sheet containing stimuli answers and recording spaces is viewably associated with said observation station;
masking means cooperably associated with said frame window comprising a tongue extending from one transverse edge towards the other and terminating intermediate said other transverse edge,
said tongue overlying that portion of the sheet containing the correct answers while at the same time being adapted to expose said other sheet portion containing stimuli and recording spaces;
means for progressively moving consecutive portions of said sheet material to said observation station whereby a portion of the stimuli thereon is exposed to view at the framed window,
the correct answer corresponding thereto being masked and a recording space exposed for inserting an answer thereon;
takeup means associated with said device for receiving and storing said sheet after an answer has been inserted on said recording space exposed at said observation station,
an electrically operable educational tool associated with said device including circuit-making means on at least a portion of the sheet material,
and circuit means connected to said electrically operable tool which cooperates electrically with said circuit-making means on said sheet for releasably coupling said tool to said device.

2. A teaching device comprising:
housing means having side and end surfaces and opposed top and bottom working surfaces;
an observation station on one of said opposed surfaces;
another observation station on the other of said opposed surfaces,
each of said observation stations defining a framed window having a bottom edge and a top edge running transversely of said housing;
means within said housing movably supporting sheet material running longitudinally of said housing,
said sheet material comprising on one side thereof a first sheet portion containing a set of stimuli, second and third sheet portions located adjacent the side of said first sheet portion in a direction transverse that of the direction of travel of said sheet material containing a set of correct answers and a set of recording spaces for recording answers thereon responsive to said stimuli;
the reverse side of said sheet material having similar portions containing additional sets of stimuli, answers and spaces;
means for guiding said sheet material within said housing so that a side of said sheet containing stimuli, answers and recording spaces is viewably associated with one of said observation stations;
masking means cooperably associated with each of said framed windows comprising a tongue extending from one transverse edge towards the other and terminating intermediate said other transverse edge,
said tongue overlying that portion of the sheet containing the correct answers while at the same time being adapted to expose said other sheet portion containing stimuli and recording spaces;
means for progressively moving consecutive portions of said sheet material to said observation station whereby a portion of the stimuli thereon is exposed to view at a framed window,
the correct answer corresponding thereto being masked and a recording space exposed for inserting an answer thereon;
and takeup means associated with said device for receiving and storing said sheet after an answer has been inserted on said recording space exposed at one of said observation stations.

3. The device of claim 2 wherein the means for moving said sheet material comprises a takeup spool adapted to move said sheet uni-directionally.

4. The device of claim 2 wherein the set of stimuli on each side of the sheet material is arranged so that when all of the stimuli on one side of the sheet material has passed its corresponding observation station, the other side is ready for viewing merely by reversing the teaching device and by moving said sheet material to said other observation station.

5. The device of claim 2 and further comprising a transparent member overlying and secured to each of said observation stations, said member having a cutout portion for exposing an answer-receiving space on said sheet portion for rendering said space accessible for recording an answer thereon adjacent the correct answer masked from view.

6. The device of claim 2 wherein each of said observation stations comprise a window formed of slots in the surface of said housing through which the sheet material is threaded for exposing a predetermined portion of the sheet material to an observer.

7. The device of claim 2 wherein the sheet material is a length of strip and wherein the support therefor comprises an unwinding spool in one portion of the housing and a takeup spool in another portion thereof.

References Cited
UNITED STATES PATENTS

| | | | |
|---|---|---|---|
| 2,169,266 | 8/1939 | Matter | 35—9 |
| 2,924,889 | 2/1960 | Di Lauro | 35—9 |
| 2,915,833 | 12/1959 | Genest | 35—22 |
| 2,715,784 | 8/1955 | Genest | 35—22 |
| 2,837,839 | 6/1958 | Fernbach | 35—76 |
| 922,182 | 1/1947 | Boudart et al. | 40—86 |
| 669,682 | 3/1901 | Carver | 40—86 |
| 439,009 | 10/1890 | Jenks | 40—86 |

EUGENE R. CAPOZIO, *Primary Examiner.*

WILLIAM GRIEB, JEROME SCHNALL, L. SMILOW, A. BERLIN, G. A. NINAS, JR., P. ARNOLD,
*Examiners.*

P. GOODMAN, *Assistant Examiner.*